(12) United States Patent
Bern

(10) Patent No.: US 7,203,733 B1
(45) Date of Patent: Apr. 10, 2007

(54) METHOD AND ARRANGEMENT FOR ACCESSING INFORMATION IN A MOBILE COMMUNICATION NETWORK

(75) Inventor: Marie Bern, Stockholm (SE)

(73) Assignee: Microsoft Mobile Internet AB, Stockholm (SE)

(*) Notice: Subject to any disclaimer, the term of this patent is extended or adjusted under 35 U.S.C. 154(b) by 0 days.

(21) Appl. No.: 09/720,885

(22) PCT Filed: Jul. 2, 1999

(86) PCT No.: PCT/SE99/01210

§ 371 (c)(1),
(2), (4) Date: Apr. 2, 2001

(87) PCT Pub. No.: WO00/02403

PCT Pub. Date: Jan. 13, 2000

(30) Foreign Application Priority Data

Jul. 3, 1998 (SE) .................... 9802401

(51) Int. Cl.
*G06F 15/16* (2006.01)
(52) U.S. Cl. .................... 709/218; 709/228
(58) Field of Classification Search ........ 709/203, 709/217–219, 224, 227, 228
See application file for complete search history.

(56) References Cited

U.S. PATENT DOCUMENTS 5,895,471 A * 4/1999 King et al. ............... 709/218
6,047,327 A * 4/2000 Tso et al. .................. 709/232
6,138,158 A * 10/2000 Boyle et al. ............... 709/225
2001/0032254 A1 * 10/2001 Hawkins ..................... 709/219

FOREIGN PATENT DOCUMENTS

| EP | 0777394 A1 | 6/1997 |
| WO | WO 9708906 A1 | 3/1997 |
| WO | WO 9727546 A1 | 7/1997 |
| WO | WO 9811744 A1 | 3/1998 |
| WO | WO 9916263 A2 | 4/1999 |

OTHER PUBLICATIONS

RFC 1630 "Universal Resource Identifiers in WWW" Berners-Lee, Jun. 1994.*

* cited by examiner

Primary Examiner—Saleh Najjar
Assistant Examiner—David Lazaro
(74) Attorney, Agent, or Firm—Workman Nydegger

(57) ABSTRACT

A method and an arrangement are provided for accessing information stored at a server and being retrievable using the Internet. According to the invention, another server is used for storing address data specifying the location of the information and for associating an identifier with the address data. The identifier is transferred to a mobile station to be used when accessing the another server. Upon such an access, the corresponding address data is derived and used for providing the information to the mobile station.

12 Claims, 4 Drawing Sheets

| identifier | URL |
|---|---|
| 7670 | http://www.cnn.com/WORLD/meast/9806/30iraq.us.missile.04 |
| 7678 | http://www.nasdaq.com/asp/quotes_quick.asp?mode=Stock&symbol=A |
| 7675 | http://www.cnn.com/WEATHER/html/LondonEngland/html |

METHOD AND ARRANGEMENT FOR ACCESSING INFORMATION IN A MOBILE COMMUNICATION NETWORK

TECHNICAL FIELD OF THE INVENTION

The present invention refers to a method for accessing information stored at a server and being retrievable using the Internet. Accordingly, the invention also includes an arrangement for providing access to information stored at a server, as well as an arrangement at a mobile station for accessing information stored at a server, said stored information being retrievable using the Internet.

BACKGROUND ART

Today there exist a numerous examples of message based services that are provided in accordance with certain standards in digital communication systems. Examples of such services are SMS (Short Message Service) and USSD (Unstructured Supplementary Service Data) in the digital mobile communication network GSM. These message based services are normally used for transferring text information to be presented on the display of a receiving mobile station, but also for transferring text or data to be interpreted by a receiving mobile station in different ways.

It is previously known to use a notification mechanism of some sort for notifying a user of a mobile station that he has received some kind of information. For example, the published patent application WO, 96/01077, being regarded as closest prior art and filed by the assignee of the present invention, discloses a system where a user of a mobile station is notified of e-mails and facsimiles addressed to the user.

In many cases however, information which is of interest to a user of a mobile station is not addressed directly to the user. A good example is information residing on a WWW (World Wide Web) server on the Internet. To take part of such "non-addressed" information requires that an Internet session is established by means of inputting a URL, indicating the location of the information, to a WWW browser. Moreover, once the user has established a connection with the information location on the WWW server, or Internet server, he might find that the information has not been updated since the last time he initiated such a connection to the same location.

From a user point of view, it is desirable to initiate a connection to an Internet information location, storing information which is of interest to the user and which is subject to regular or occasional changes, after an information update. It is also desirable that this connection is established in a simplified way following such an update.

SUMMARY OF THE INVENTION

An object of the present invention is to provide an easy way for a user of a mobile station to access certain information published on the Internet.

Another object is to provide a scheme in which a user of a mobile station becomes aware of that certain new or updated information has been published on the Internet.

Another object is to provide a simple way for a user that has been notified of the existence of certain information to initiate a connection with the particular information location in question and to access any new or updated information on that location.

The above objects are achieved by a method and arrangements for accessing information in accordance with the appended claims.

According to a first aspect of the invention, there is provided a method for accessing information stored at an information server and being retrievable using the Internet, the location of said information being specified by address data stored at an address server which is connected to the Internet, the address data being associated with an identifier in said address server, characterized in that the method includes the steps of: transmitting said identifier in a message from said address server to a mobile station using a short message based service provided in a mobile communication network; retrieving, at said mobile station, said identifier from said message and relaying the identifier to Internet access means associated with the mobile station; accessing said address server from said Internet access means, using an Internet protocol over a data communication bearer service provided to said mobile station by said mobile communication network, by transmitting a URL designating said address server; selecting said information with said Internet access means by using said identifier as an argument to said URL when accessing the address server; and providing said information, identified with the address data derived from the identifier, to said mobile station using an Internet protocol over said data communication bearer service.

According to a second aspect, the invention includes an arrangement at a server for providing access to information stored at an information server and being retrievable using the Internet, the arrangement including storing means for storing address data specifying the location of said information and for storing an identifier which is associated with said address data, characterized in that the arrangement further includes: transmitting means for transmitting said identifier in a message to a mobile station using a short message based service provided by a mobile communication network; and Internet access means for, during an Internet session with said mobile station, receiving said identifier as an argument in a URL transmitted from the mobile station and deriving the address data associated with said identifier, wherein said derived address data identifies said information which should be transferred to said mobile station by means of an Internet protocol over a data communication bearer service provided by said mobile communication network.

Correspondingly, according to a third aspect, the invention provides an arrangement at a mobile station for accessing information stored at an information server and being retrievable using the Internet, characterized in that the arrangement includes: receiving means for receiving from an address server an identifier being transferred in a message of a short message based service provided by a mobile communication network; and Internet access means for attaching said received identifier as an argument in a URL designating said address server, accessing said address server, by means of the URL, using an Internet protocol over a data communication bearer service provided by the mobile communication network, and for receiving said information over said Internet protocol and said data communication bearer service.

The invention is based upon the idea of using a notification scheme to alert a user of a mobile station that certain information, in which the user has a particular interest and which can be retrieved using the Internet, is accessible. A notification including an identifier is sent in a message from an address server to a mobile station. The identifier uniquely identifies a corresponding URL for a specific information location on an information server storing said information to be accessed. Upon responding to said notification, the mobile station uses said identifier as part of a URL (Universal Resource Locator) which is used for accessing said address server. Based on said identifier the address server derives the corresponding URL, which was associated with the identifier prior to the notification, and initiates the process of providing said information to the mobile station. Accordingly, said address server communicates with different information servers by means of the Internet, as well as with mobile stations by means of a mobile communication network.

The inventive address server is preferably either operated by an Internet service provider or by the operator of the mobile communication system to which the mobile station is connected. The information resides at an information location pertaining to any information server, i.e. any Internet server, being reachable over the Internet and being operated by an Internet content provider.

Using the present invention, the operator of the herein described address server will be able to provide mobile station users with a number of services. The aim of these services would be to provide the users of the mobile communication network access to information residing on any information server and being accessible using the Internet. Such a service could be based on any of the following exemplified principles being applied by the address server: the address server monitors a predefined information location on an information server of any Internet content provider; the address server searches the Internet on behalf of a user for information locations with information matching a user's predefined profile; the address server accepts push data transfers from a certain information location; or the address server permits a third party to invoke the process of providing a user with information from a particular information location.

In the context of this invention, address data stored at the address server includes data for pointing out the Internet server holding the information to be accessed as well as the location of said information on said Internet server. One preferred way of realising this address data is to use the URL of the information, in which case also the protocol to use for accessing the information will be given. A URL will indicate whether the information is accessed using HTTP (HyperText Transfer Protocol) or FTP (File Transfer Protocol). However, any other protocol which might be used when accessing the Internet could be incorporated in this addressing data. The expression Internet protocol should therefore, in the present invention, be interpreted as any protocol for transferring data over the Internet, or a similar network. One such other protocol which would be suitable for the present invention is WTP (Wireless Transport Protocol) used within the WAP (Wireless Application Protocol) standard.

The same discussion goes for how the mobile station uses the identifier as an argument in a URL when accessing the address server which stores the different address data. That is, the URL represents the preferred way of accessing the address server, however, another accessing scheme, taking the identifier as an argument, could also be used by the mobile station.

The particular information location of interest to a mobile station user can be chosen in a number of different ways. The easiest way would preferably be to subscribe to a service provided by the operator of the address server. Such a service is then, for example, preconfigured to cover a particular information location, or, the user is free to in advance associate any information location of his choice to be covered by the service. Hence, the user saves a lot of time and effort in his ambition of being constantly updated of the latest information published on a particular information location. Any information published on an Internet server can be accessed in this way. The invention is particular favourable for accessing information that undergoes more or less regular changes, such as news bulletins, stock quotes or weather reports.

Of course, the new or updated information could occasionally also be information published by the address server operator itself on its own Internet server rather than on an Internet server of another Internet content provider. This could, for example, be information concerning new services provided by the operator or any other kind of general information of interest to the users using the operator's services. The operator, as mentioned, being either the operator of the mobile communication network or an Internet service provider.

According to a preferred embodiment of the invention, said address data, derived by said address server using a corresponding identifier received from the mobile station, is used by the address server for accessing the information server containing said information and for providing said information to said mobile station via said address server. Thus, in this embodiment, the address server storing the address data to the information location relays the information to the mobile station when requested by the mobile station.

According to another embodiment of the invention, said address data, derived by said address server using a corresponding identifier received from the mobile station, is transmitted to the mobile station, which mobile station uses the address data for accessing the Internet server holding the information, wherein said information is provided directly to said mobile station. Thus, a browser at the mobile station is able to use the address data for accessing information at an Internet server via the mobile communication network and a gateway connecting the network to the Internet, rather than having to use the address server as a relay node. In this embodiment the user of course could have the option, even though it is not necessary, to store the address data for later retrieval, or merely to see what location he is actually accessing.

Thus, an advantage of the invention is that the address data of a particular information location does not need to be stored in the mobile station, or be explicitly inputted by the user of the mobile station, since the connection establishment to the information location utilises address data which is stored on an address server separated from the mobile station. This greatly simplifies the process for a user when accessing information on the Internet.

Another advantage of the invention is that the user does not have to access the information location at an Internet server to check whether or not any new or updated information has been published. Instead he can rely on that any new Internet information published on the location of interest will come to his attention by means of a notification alerting the user of the information update.

It is to be understood that a mobile station in the present invention is to be interpreted as a device communicating with a mobile communication network, i.e. a cellular telephone, any portable terminal or computer being able to communicate using a wireless connection or a combination of the two, i.e. a unit comprising of a portable computer connected to a cellular telephone, or the like. As a consequence, a browser at a mobile station is understood to herein be interpreted as a browser either loaded in the mobile station itself or as a browser loaded in a portable computer connected to the mobile station. This browser could be quite simple and be tailored to only meet the requirements of the operator's services, or, it could be any today, or in the future, commercially available browser with all its facilities.

Examples of message based services to be utilised by the present invention are SMS (Short Message Service) and USSD (Unstructured Supplementary Service Data) in the digital mobile communication network GSM. However, the invention is also applicable using any other message based service in an existing, or future, digital mobile communication network such as GSM, IS-136, CDPD, CDMA, PDC, W-CDMA, UMTS/IMT-2000 and so on.

A software module at the mobile station, referred to below as "client function", extracts the identifier from the received message carrying the notification from the address server. The client function may also interpret the identifier to, for example, examine its classification or other type of information which could have been merged or attached to the identifier. Such identifier information could be of use when handling the identifier itself in the mobile station or when handling the information eventually received when responding to the notification having that particular identifier. It should be understood that the identifier discussed in this application very well could include the above mentioned additional information merged with, or attached to, the actual identification of an identifier.

At the mobile station the extracted identifier is preferably treated in such a way the client function, or the browser, automatically attaches the identifier to a prestored URL, i.e. a proxy URL, designating the address server. This simplifies for a user of a mobile station to access the address server and its address data corresponding to the identifier.

The above mentioned and further aspects and features of, as well as advantages with, the present invention, will be more fully understood from the following description, with reference to the accompanying drawings, of exemplifying embodiments thereof.

BRIEF DESCRIPTION OF THE DRAWINGS

Exemplifying embodiments of the invention will now be described below with reference to the accompanying drawings, in which.

DETAILED DESCRIPTION OF PREFERRED EMBODIMENTS

Figure 1:
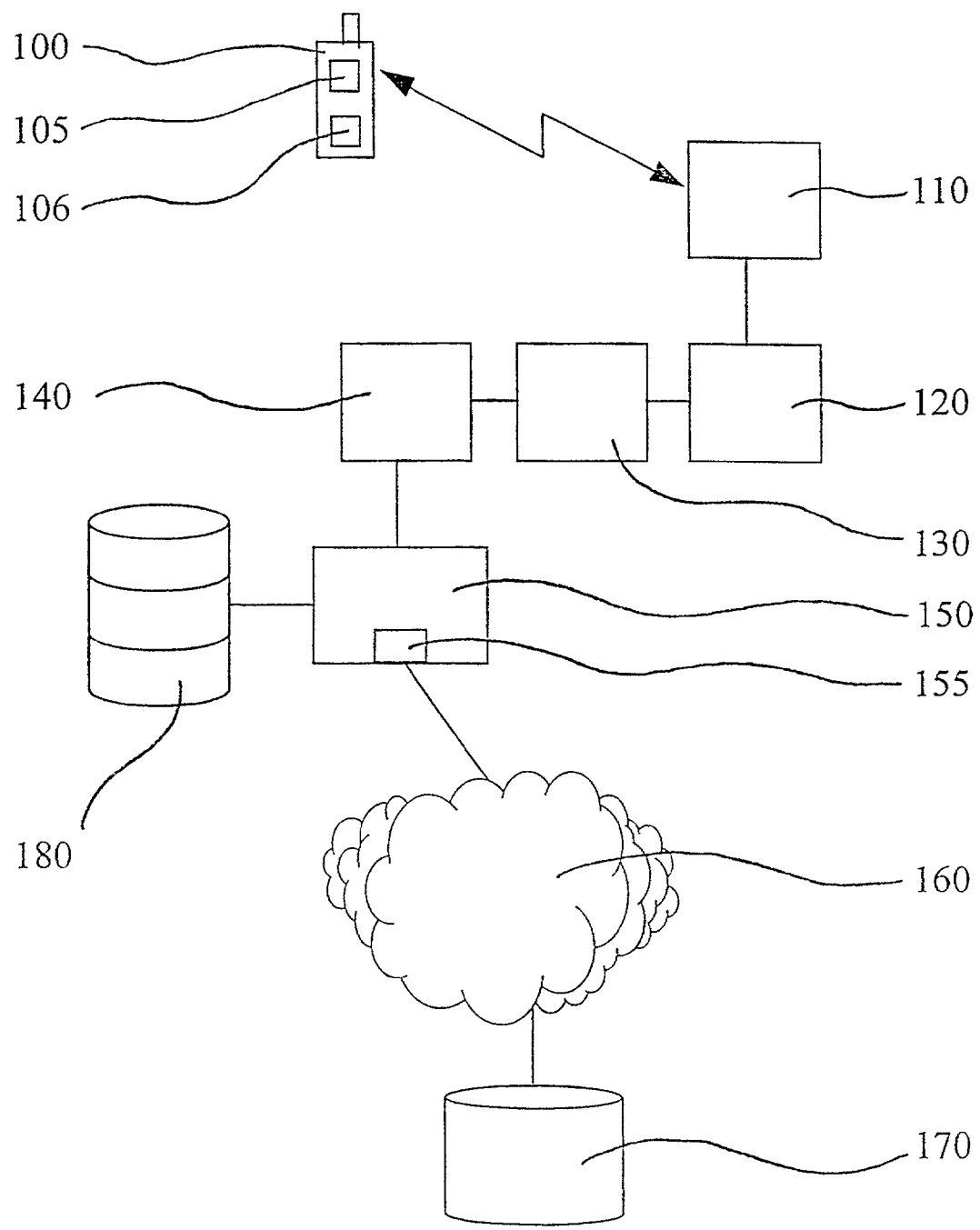
FIG. 1 schematically shows an exemplified system in accordance with the present invention.

FIG. 1 shows an exemplified system for carrying out the method in accordance with the present invention. In this system an address server 150 is reachable from a mobile station 100 via a mobile communication network 110, 120, 130, which network interfaces the server through the Interface means 140. Via the Internet 160 the address server 150 has access to information stored on a remote Internet server 170, which information is retrievable using the Internet by means of Internet access means 155. Based on the ability to access the information server 170 using the Internet, the server 150 provides services relating to the information stored on the information server via the mobile communication network 110, 120, 130 to the mobile station 100.

In FIG. 1 the mobile communication network is exemplified with a GSM mobile communication network (Global System for Mobile communication). An MSC switch 120 (Mobile service Switching Centre) communicates with the mobile station 100 via a base station 110. The MSC switch manages the traffic to/from the mobile station 100, which may be a speech connection in progress, the transfer of a short message, such as an SMS (Short Message Service) message, or some other GSM traffic. The SMS messages directed to receiving mobile stations through the mobile communication network are switched in an SMS centre (SMS-C) 130. This SMS centre attends to that SMS messages are directed to a certain MSC, and hence, eventually, to the right receiver in accordance with commonly known techniques.

The address server 150 is connected to the mobile communication network by means of a gateway 140. The gateway, or interface means, converts traffic handled by the address server to GSM traffic, and vice versa. The operator of the address server provides, by means of the server, different types of services to the users of the mobile stations connected to the mobile communication network. In accordance with the invention, the aim of these services is to provide the users with information which is accessible using the Internet. One scheme on which such a service could be based is to monitor a predefined information location on an information server of an Internet content provider for information changes. How to implement this scheme would be straight forward for a person skilled in the art.

When the server has gained knowledge of the existence of new or updated information on the information server, which information is of relevance to a user in accordance with a service to which a user subscribes, the address server will store the address data to, or the URL of, the particular information location. Here, a database 180 connected to, or incorporated in, the address server is used as storage means for this purpose. This address data is associated with an identifier which also is stored in the database.

The address server 150 then creates an SMS message in which the identifier, also called an "agent", is stored. The SMS message is then transmitted to the mobile station 100, via the interface means 140, the SMS-C 130, the MSC switch 120 and the base station 110, for notifying the user of the existing information on a remote information server 170. At the mobile station a client function 105 implements the means for receiving the identifier. At reception of the SMS message at the mobile station, the client function 105 extracts the identifier from the SMS message, after which the user by means of the identifier initiates the process of accessing the information stored at the remote information server. This accessing process is started by using the received identifier in the Internet access means 106 being arranged at the mobile station and implemented by a WWW browser.

Figures 2, 3:
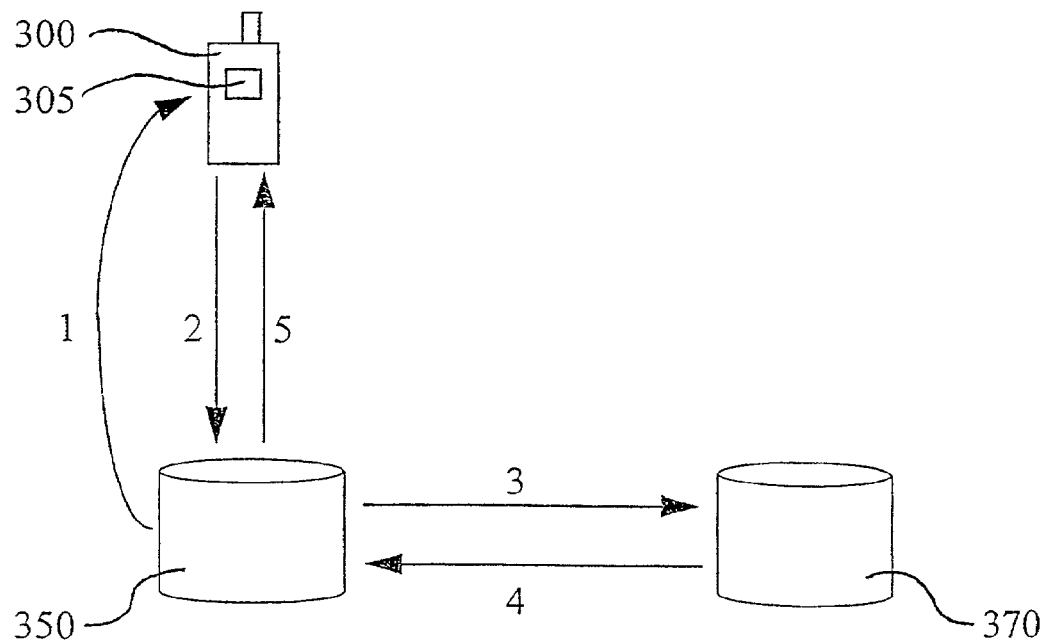
FIG. 2 shows exemplifying associations of address data with identifiers in accordance with the present invention.
FIG. 3 schematically shows how information is provided to a mobile station in an embodiment of the present invention.

FIG. 2 shows exemplifying URL:s, representing address data to information locations with information being accessible using the Internet. These address data are together with their associated identifiers stored in a table in the database 180 of FIG. 1. For some services the table will be prestored with address data, while for other services the table will be occasionally updated during the lifetime of the service subscription. The identifier, which upon notification is transmitted to the mobile station, uniquely identifies a route to where the associated address data is stored in the database.

In FIG. 3 a preferred embodiment of the operation according to the invention is schematically illustrated. An address server 350, in this example belonging to the operator of a mobile communication network, communicates with a mobile station 300 by means of said network. Via the Internet, the server 350 has access to and monitors information stored on a remote information server 370 provided by an Internet content provider which publishes information on the Internet. When the address server 350 detects that information of relevance to the user has been published or updated on the information server, an SMS message is created by the address server and sent to the mobile station for notifying the user of the published information, which is indicated with arrow 1. As described above, the address data to the information location together with its associated identifier are stored in a database at the address server 350. The identifier is stored in the SMS message transmitted to the mobile station, which upon reception of the SMS message extracts and manages the identifier by means of its client function 305.

When, and if, the user decides to respond to the received notification, the client function will forward the identifier to a browser at the mobile station, which in turn will attach the identifier as an argument to a, preferably predefined, URL being used for accessing the server 350. The user initiates a response by, for example, selecting an identifier from a menu followed by a single push on a keypad. This response procedure is either performed using the mobile station itself or a any portable computer device being connected to the mobile station, depending upon where the WWW browser is located. By means of the browser, the mobile station and the URL with the attached identifier, an Internet session is established with the server 350. Arrow 2 indicates the transfer of the identifier to the server 350 as part of the URL. Using the identifier, the server 350 derives the corresponding unique address data to the requested Internet information location and fetches the information using this address data. Arrow 3 indicates the accessing of the requested information location over the Internet. The following information transfer from the remote information server 370 to the address server 350 during an Internet session is indicated with arrow 4. When server 350 starts to receive information from the location having said address data, this information will be forwarded to the browser at the mobile station by means of the Internet session previously established between the mobile station and the server. This information transfer is indicated with arrow 5.

Figure 4:
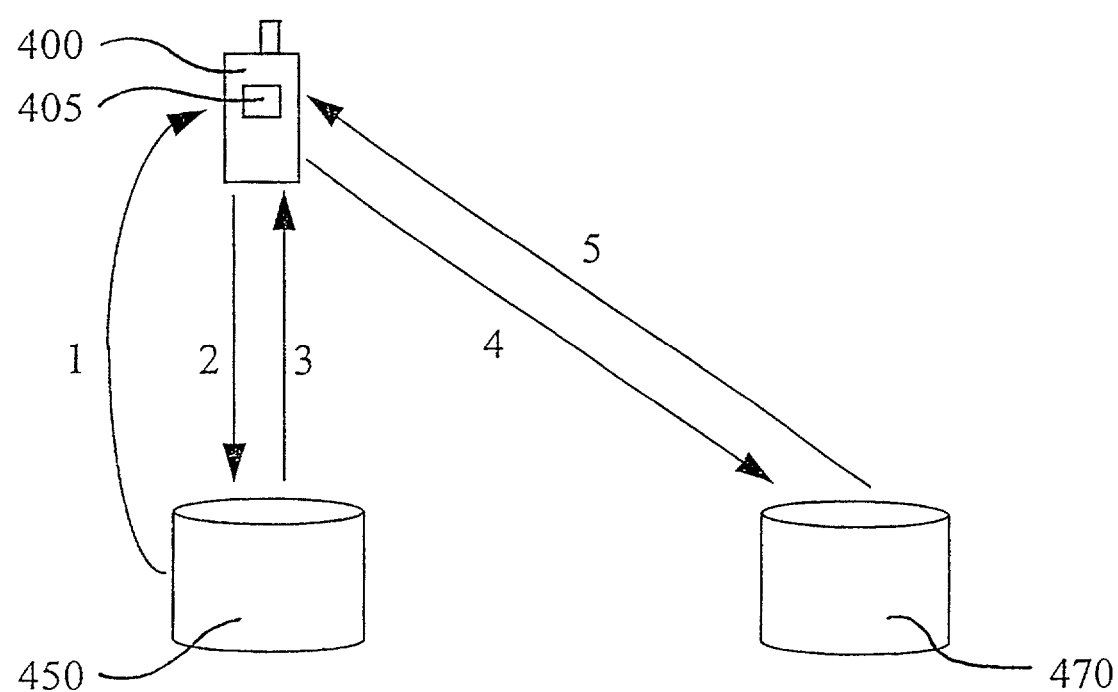
FIG. 4 schematically shows how information is provided to a mobile station in another embodiment of the present invention.

In FIG. 4 another embodiment of the operation according to the present invention is schematically illustrated. The basic system configuration corresponds to that of FIG. 3, i.e. an address server 450 is connected to the Internet and communicates with the mobile station 400 via a mobile communication network. As in the previously described embodiment, the address server 450 sends an SMS message, indicated with arrow 1, with an identifier to the mobile station for notifying a user that information has been published on a particular remote information server 470. In accordance with what was previously described with reference to FIG. 3, the user responds to this notification, arrow 2, and the server 450 derives the address data corresponding to the identifier to which the user has responded. However, the server 450 does not use the derived address data for directly accessing the remote server 470, but transfers the address data to the mobile station and its WWW browser using the Internet session established between the mobile station and the address server, the transfer being indicated with arrow 3. Upon reception of this address data, the WWW browser will load and use the address data for directly accessing the information location at the remote server 470 by means of an Internet session being established over the Internet, which is indicated with arrow 4. This accessing is of course done via a base station, an MSC switch and interface means interfacing the MSC with the Internet. Information is then transferred directly from the remote information location to the mobile station using the established Internet session, which transfer is indicated with arrow 5.

Figures 5, 6:
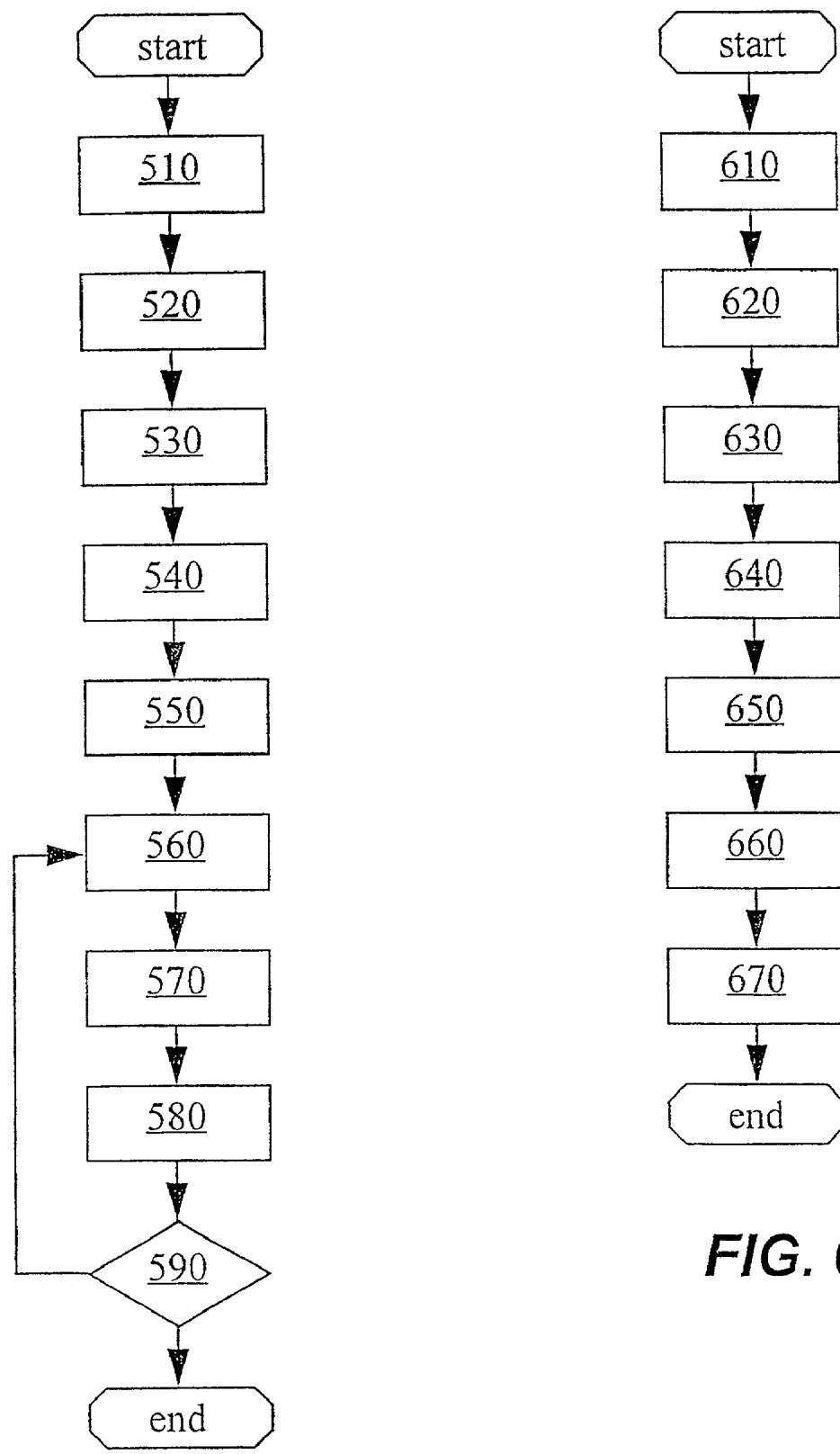
FIG. 5 is a flow chart illustrating the process at an arrangement for providing access to information at a server according to an embodiment of the present invention.
FIG. 6 is a flow chart illustrating the process at a mobile station for accessing information at a server according to an embodiment of the present invention.

FIG. 5 is a flow chart illustrating the process at an address server, which server provides a mobile station with access to information being retrievable using the Internet and stored at some information server, in accordance with an embodiment of the present invention.

The process starts in step 510 with detection of that new or updated information has been published on a particular remote Internet server location. In step 520 an identifier is associated with the address data of the particular remote Internet server location and the address data together with its identifier is stored in a database to which the address server has access. In the following step 530 an SMS message is created in which the identifier is stored, after which the SMS message is sent over the GSM network to the mobile station for notifying that information has been published. In step 540 an Internet session with the mobile station is established on the initiative of the mobile station. The URL used by the mobile station for initiating this session has an identifier attached which will address a certain location on the address server. In step 550 the unique address data corresponding to the identifier is derived from the location given by the identifier. In the following step 560 this address data is used for accessing an information location on the remote Internet server storing the information of interest. In step 570 the information is received from the remote server during the Internet session between the address server and the remote Internet server. This received information is directly forwarded to the mobile station via the GSM network and the existing Internet session between the address server and the mobile station, which is shown as step 580 in the flow chart. The accessing of the remote Internet server's information location, and the transfer of information from that remote server, via the address server, to the mobile station, continues until the address server in step 590 receives an indication that the user of the mobile station wishes to abort the current ongoing information transfer or session of the subscribed service.

In FIG. 6 a flow chart illustrates the process at a mobile station for accessing information at a remote Internet server in accordance with an embodiment of the present invention.

The process starts in step 610 with the reception of an SMS message by the mobile station from the address server arranged by an operator to provide Internet information to the mobile station via the GSM network. The reception is done in accordance with the commonly known technique of receiving an SMS message at a mobile station from a GSM mobile communication network. In step 620 the mobile station extracts the identifier from the SMS message using a client function, implemented as a software module in the mobile station. This client function operates as receiving means in the mobile station for receiving the identifier from said address server. In step 630 the identifier is selected to initiate the reception of the information, whereby in step 640 the identifier is transferred to the Internet access means being realised as a WWW browser arranged at the mobile station. In step 650 the WWW browser attaches the identifier as an argument to an URL already known to the browser and designating said address server. Thereafter, in step 660, the browser uses the URL, including its attached identifier, for accessing the address server. Finally, in step 670, the browser receives the Internet information being transferred from the operator's address server.

It is understood that the construction and function of the elements described with reference to the drawings will become apparent for those skilled in the art.

Even though the invention has been described with reference to specific exemplifying embodiments, many different alterations, modifications and the like will become apparent for those skilled in the art. The described embodiments are therefore not intended to limit the scope of the invention, as defined by the appended claims.

The invention claimed is:

1. A method for accessing information determined to be of relevance to a user, the information being stored at an information server and being retrievable using the Internet, the location of said information being specified by address data stored at an address server which is connected to the Internet, the address data being associated with an identifier in said address server, the method comprising the acts of:
   monitoring, at said address server, a remote predefined information location on said information server over the internet for information that is determined to be of relevance to a user;
   upon determining from the act of monitoring that information relevant to a user is available at the remote predefined information location and prior to retrieving the information from the remote predefined location, generating a data structure that includes an identifier associated with address data corresponding to the predefined information location and transmitting said data structure in a message from said address server to a mobile station corresponding to the user, using a short message based service provided in a mobile communication network;
   retrieving, at said mobile station, said identifier from said message and relaying the identifier to means for accessing the Internet associated with the mobile station;
   accessing said address server from said means for accessing the Internet, using an Internet protocol over a data communication bearer service provided to said mobile station by said mobile communication network, by transmitting a URL designating said address server;
   selecting said information with said means for accessing the internet by using said identifier as an argument to the URL which designates said address server when accessing the address server;
   in response to said mobile station accessing said address server, retrieving, by said address server, said information, identified by the address data associated with the identifier, from said information server by using said address data associated with the identifier at said address server to access said information server over the internet; and
   forwarding, by said address server, said information retrieved from said information server, to said mobile station using an Internet protocol over said data communication bearer service.

2. The method as claimed in claim 1, wherein said accessing act comprises attaching said identifier as an argument to a mobile station prestored URL designating said address server.

3. The method as claimed in claim 1, wherein said act of transmitting said data structure to said mobile station is performed to notify said mobile station of a change in said information at said information server.

4. The method as claimed in claim 1, wherein said mobile communication network is a GSM network and said message based service is a mobile data service provided by said GSM network.

5. The method as claimed in claim 4, wherein said mobile data service is either an SMS or USSD service.

6. A method as recited in claim 1, wherein the URL designating the address server is prestored, and wherein, upon retrieving the identifier, the mobile station automatically attaches the identifier to the prestored URL.

7. A method as recited in claim 1, wherein said information is determined to be relevant to a user upon being published or updated on the information server.

8. An arrangement at a server for providing access to information determined to be of relevance to a user, the information being stored at an information server and being retrievable using the Internet, the arrangement comprising:
   means for monitoring a remote predefined information location on said information server over the internet for information that is relevant to a user;
   means for storing address data specifying the location of said information and for storing an identifier which is associated with said address data;
   means for generating a data structure that includes an identifier associated with address data corresponding to the predefined information location and transmitting said data structure in a message to a mobile station using a short message based service provided by a mobile communication network upon determining that information relevant to the user is available at the remote predefined information location and prior to retrieving the information from the remote predefined information location;
   means for receiving, during an Internet session with said mobile station, said identifier as an argument in a URL which designates said address server transmitted from the mobile station, and deriving the address data associated with said identifier, wherein said derived address data identifies said information which should be transferred to said mobile station; and
   means for providing said information identified with said derived address data to said mobile station, the means comprising:
      means for using said derived address data to retrieve said information from said information server over the internet in response to receiving said identifier from said mobile station; and
      means for forwarding said information retrieved from said information server to said mobile station using an Internet protocol over a data communication bearer service-provided by said mobile communication network.

9. An arrangement at a mobile station for accessing information determined to be of relevance to a user, the information being stored at an information server and being retrievable using the Internet, the arrangement comprising:
   means for receiving from an address server an identifier being transferred in a message of a short message based service provided by a mobile communication network, wherein the message is transferred to the mobile station in response to an address server monitoring a remote predefined information location on said information server over the internet for information that is determined to be of relevance to a user, and wherein the message is generated and transmitted to the mobile station prior to the address server retrieving the information from the predefined location, and wherein the identifier included in the message is associated with address data corresponding to the predefined information location;

means for attaching said received identifier as an argument in a URL designating said address server, and accessing said address server, by means of the URL, using an Internet protocol over a data communication bearer service provided by the mobile communication network; and means for receiving said information from said address server over said Internet protocol and said data communication bearer service, said information having been retrieved by the address server from the information server over the internet in direct response to the address server being accessed by the mobile station.

10. The arrangement as claimed in claim 9, wherein said access means are provided to attach said identifier as an argument to a mobile station prestored URL designating said address server.

11. A method at a server for providing access to information determined to be of relevance to a user, the information being stored at an information server and being retrievable using the Internet, the location of the information being specified by address data stored at the server, the address data being associated with an identifier in the server, the method comprising:

monitoring a remote predefined information location on the information server over the internet for information that is relevant to a user;

upon determining from the act of monitoring that information relevant to a user is available at the remote predefined information location, and prior to retrieving the information, generating a data structure that includes an identifier associated with address data corresponding to the predefined information location and transmitting the data structure in a message from the address server to a mobile station corresponding to the user using a short message based service provided in a mobile communication network;

receiving from the mobile station, using an Internet protocol over a data communication bearer service, the identifier as an argument in a URL which designates the server;

deriving the address data associated with the identifier, wherein the derived address data specifies the location of the information; and in response to receiving the identifier from the mobile station, retrieving the information from the information server by using the address data associated with the identifier at the address server to access the information server over the internet; and forwarding the information retrieved from the information server to the mobile station using an Internet protocol over the data communication bearer service.

12. A method at a mobile station for accessing information determined to be of relevance to a user, the information being stored at an information server and being retrievable using the Internet, the location of the information being specified by address data stored at an address server, the address data being associated with an identifier in the address server, the method comprising:

receiving, from the address server, an identifier being transferred in a message of a short message based service provided by a mobile communication network, the identifier being associated with address data stored in the address server, the address data specifying the location of information determined to be of relevance to a user, the location of the information having been determined by the address server by means of the address server monitoring the information server and determining that the information is available and of relevance to the user;

attaching the received identifier as an argument in a URL designating the address server and accessing the address server, by means of the URL, using an Internet protocol over a data communication bearer service provided by the mobile communication network;

receiving the information from the address server using an Internet protocol over the data communication bearer service, the information having been retrieved from the information server by the address server over the internet in response to the address server having been accessed by the mobile station.

* * * * *

UNITED STATES PATENT AND TRADEMARK OFFICE
CERTIFICATE OF CORRECTION

PATENT NO.       : 7,203,733 B1
APPLICATION NO.  : 09/720885
DATED            : April 10, 2007
INVENTOR(S)      : Marie Bern It is certified that error appears in the above-identified patent and that said Letters Patent is hereby corrected as shown below:

<u>Title Page</u>:

Item [73], Assignee, change "Microsoft Mobile Internet AB, Stockholm (SE)" to --Microsoft Corporation, Redmond, Washington (US)--.

Signed and Sealed this

Twenty-first Day of August, 2007

JON W. DUDAS
*Director of the United States Patent and Trademark Office*